R. G. BARZEN.
HEAT CONTROLLING DEVICE.
APPLICATION FILED MAR. 30, 1921.

1,416,544.

Patented May 16, 1922.

INVENTOR
Richard G. Barzen
BY Arthur C. Brown
ATTORNEY

UNITED STATES PATENT OFFICE.

RICHARD G. BARZEN, OF KANSAS CITY, MISSOURI.

HEAT-CONTROLLING DEVICE.

1,416,544. Specification of Letters Patent. Patented May 16, 1922.

Application filed March 30, 1921. Serial No. 456,950.

*To all whom it may concern:*

Be it known that I, RICHARD G. BARZEN, a citizen of the United States, residing at Kansas City, in the county of Jackson and State of Missouri, have invented certain new and useful Improvements in Heat-Controlling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to electrically heated irons and one of the objects thereof is to provide a thermostatically controlled cutout or circuit breaker which will operate in response to a rise in temperature of the heat within the iron so that in the event that the iron reaches a determined temperature, the flow of current will be reduced either fractionally or completely, it being contemplated in one embodiment of the invention to introduce a resistance across the gap spaced by the terminals so that when the current through the main line is interrupted, a reduced flow of current may still be maintained sufficient to permit the iron to remain warm but not enough to allow the temperature rise to reach a dangerous point.

The invention contemplates means whereby the temperature of the iron at which the thermostat will operate may be controlled by controlling the amount of atmospheric air adapted to contact with the expansion element of the thermostat.

I have shown the invention applied to a flat iron although it is equally applicable for use in the various kinds of electrically heated irons for whatever purpose and wherever a thermostat is employed. Therefore, I do not wish to be limited to the particular use of the invention shown in the drawings, for example, the invention might also be applied to branding irons, soldering irons, percolators, mangles, toasters, chafing dishes and irons for other industrial purposes.

Various means may be provided for effecting the control of the quantity of air contacting with the expansion element of the thermostat but a convenient form of effecting the control is illustrated in the accompanying drawings.

Figure 1:
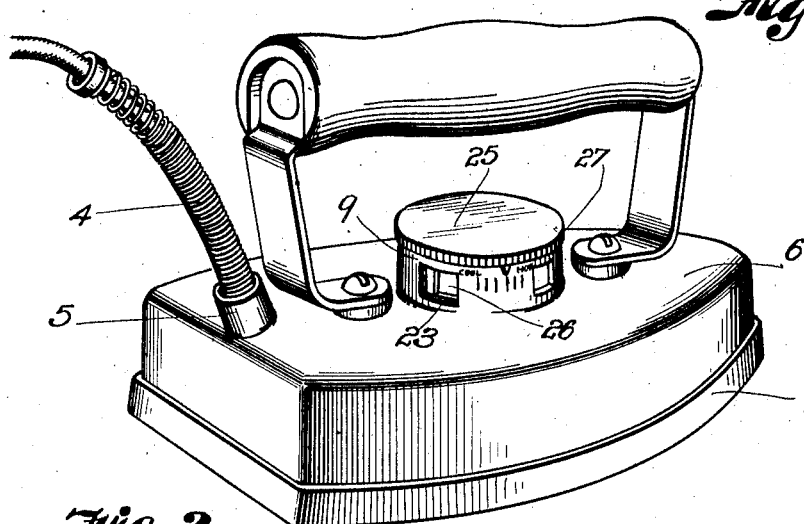
Figure 1 is a perspective view of an electrically heated flat iron constructed in accordance with my invention.

Referring now to the drawings by numerals of reference:

The iron 1 may be of conventional construction insofar as the heating element 2 is concerned and the heating element may receive current through the conductor 3 carried by the cord 4, which may be fastened to the heel of the iron by a permanent coupling or securing means 5, which may be in the form of a tube pressed out from the shell 6, which constitutes the cover or housing for the heating element.

The conductor 3, after passing through the heating element 2, may be fastened to a binding post 7 in the floor of the cup-shaped housing 8, which carries the thermostat. The housing may be secured to the shell 6 by the upturned flange 9, as clearly seen in Fig. 2.

The return wire 10, which completes the circuit, is shown as fastened to a fixed binding post 11 in the floor of the housing 8 and if desired, the resistance 12 may connect the binding posts 7 and 11, as will be apparent hereinafter.

The binding post 11 extends into the chamber 13 formed by the cup-shaped housing 8 and supports a laterally swinging contact arm 14, which is shown as provided with a hub or sleeve 15, mounted upon the post 11 and held thereon by a screw 16. In rear of the post 11 is an anchor post 17, carried by the floor of the housing 8 and supporting an expansible thermostatic element 18, which engages the notch 19 in the hub or sleeve 15 or the arm 14. The thermostatic element 18 is shown in the drawings as consisting of a coil of expansible material which, under the action of heat, will swing the arm 14 about its pivot 11 to cause its contact 20 to move away from the contact 21 on the binding post 7, the swinging movement of the arm 14 being limited by the stop pin 22.

The flange 9 and the wall of the housing 8 are provided with aligning openings 23 and 24 about the perimeter of the housing and flange and these openings may be valved by the cylindrical valve member 25, sleeved within the housing 8 and provided with openings 26, which may be coextensive with the openings 23 and 24 but which may be moved out of alignment therewith so that the intermediate wall portions of the valve may close off or restrict the effective port areas of the openings 23 and 24. The top edge or flange 27 of the valve 25 may be knurled if desired to facilitate the turning movement thereof.

The bottom or floor of the housing 8 is provided with segmental openings 28 and 29, the effective port area of which are adapted to be controlled by the inwardly extending valve projections 30 and 31, the valving action of the projections 30 and 31 alternating with the valving action of the wall valve 15.

Figure 2:
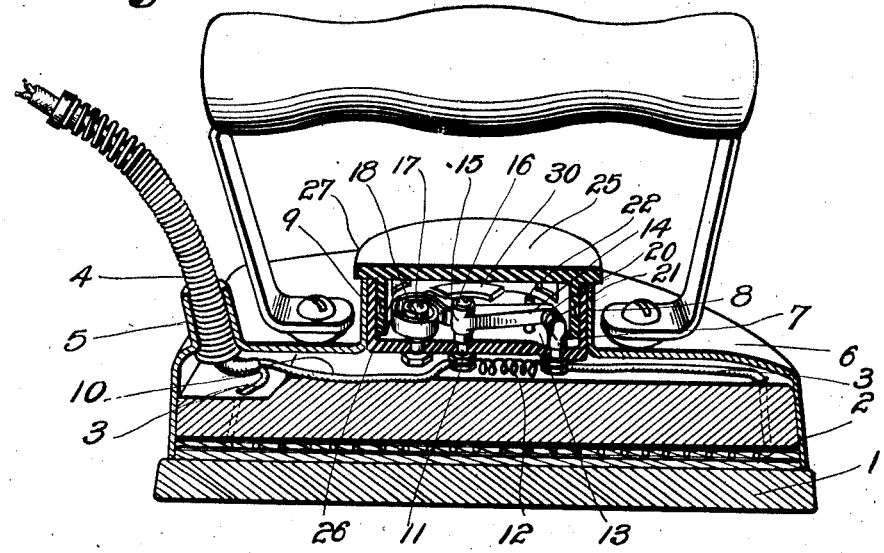
Fig. 2 is a vertical, longitudinal, sectional view through the iron, the handle being shown in elevation.
Figure 3:
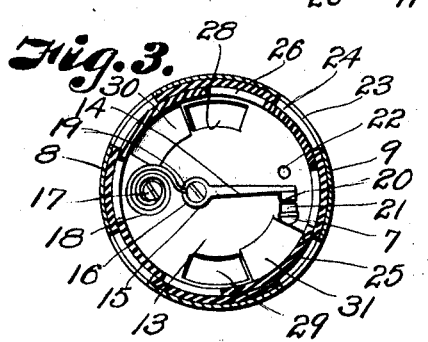
Fig. 3 is a cross sectional view through the air valving means, the thermostat being shown in plan.
Figure 4:
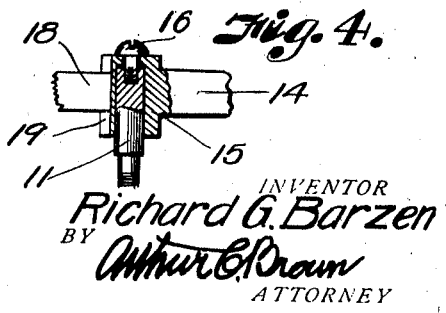
Fig. 4 is a view partly in section and partly in elevation of the thermostat.

Assuming the parts to be properly assembled as shown in Figs. 1 and 2 with the thermostatic element 18 retracted so that the contacts 20 and 21 will be together, current will flow through the conductor 3, through the heating element to binding post 7, through contacts 21 and 20 to binding post 11, to conductor 10 back to the socket. Normally the cylindrical valve 25 will be turned so that the entrance of air will be cut off or restricted from entering the chamber 13 formed by the housing 8. The ports 28 and 29, however, will be open.

When the heat generated within the case 6 has reached a high enough temperature, the radiated heat through 28 and 29 will be communicated to the thermostatic element 18, causing it, at the proper rise in temperature, to expand so that the arm 14 will be swung about the axis of the hub 15, moving the contact 20 away from 21. Then the current will be broken through the usual source and the iron allowed to cool.

The resistance 12 will permit a reduced amount of current, however, to pass from the binding post 7 to the binding post 11 so that there will still be current passing through the heating element 2. Its flow will be considerably retracted so that the iron cannot get hot enough to scorch or burn. The resistance 12, however, may be eliminated so that the current will be entirely interrupted as resistance is not absolutely essential to the operation of my device but has certain advantages under certain conditions.

The operation just described will apply to the lowest point in the range of temperature to be controlled.

If it is desired to allow the iron to become quite hot before the thermostat operates, the valve 25 will be rotated so that the valve members 30 and 31 will close off the ports 28, and the ports 26 will be caused to register with the ports 23 and 24 so that atmospheric air may be admitted to the inside of the casing and direct heat communication with the interior of the casing 8 will be cut off. Then the iron will reach a relatively high temperature before enough heat is conducted to the thermostat 18 to cause it to expand. When it does expand, however, its operation will be substantially like that described as the first example.

Variations in temperature between these two extremes may be provided for by varying the turning movement of the valve member 25 to vary the effective port area in the side of the casing and in the floor thereof. Therefore, it will be apparent that the thermostat can be controlled at any temperature between two extremes.

I would have it understood that I do not limit myself to the exact details of construction shown nor to the specific form of device illustrated but reserve the right to make such changes in form, proportion and minor details of construction as properly come within the scope of the following claims.

I would also have it understood that the word "electric iron" in the claims contemplates any form of electrically heated device with which my invention is applicable.

What I claim and desire to secure by Letters-Patent is:

1. An electric iron having an electric heating circuit, a thermostatically operated circuit breaker in the circuit and movable in response to heat generated in the iron, and means for variably exposing the thermostat to atmosphere whereby the thermostat may operate at different degrees of heat within the iron.

2. An electric iron having a thermostatically controlled heat circuit therein, and means for exposing the thermostat to the action of atmosphere, said means being also effective for closing off the thermostat from the action of atmosphere.

3. An iron having a heat generating circuit therein, a housing connected to the iron, a thermostat in the housing, contacts in the housing, one of which is movable with respect to the other to interrupt the flow of current through the circuit, the movable contact being operated in response to movement of the thermostat, and a valve for varying the effective port areas of openings in the housing through which the housing communicates with atmosphere.

4. An iron having a heat generating circuit therein, a housing at the top of the iron having openings communicating with openings in the heat chamber, said housing having openings communicating with atmosphere, a pair of contacts in the housing and in the circuit, one of the contacts being movable with respect to the other, a thermostat in the housing for varying the space between the contacts, and valving means associated with the housing for varying the effective port areas of the openings in the housing which communicate with the heat chamber inversely in proportion to the variations of the openings in the housing which communicate with atmosphere.

In testimony whereof I affix my signature.

RICHARD G. BARZEN.